US008617623B2

(12) United States Patent
Shen et al.

(10) Patent No.: US 8,617,623 B2
(45) Date of Patent: *Dec. 31, 2013

(54) CHEWING GUM WITH DELAYED-INTERACTION MODIFIER

(75) Inventors: Chungsea A. Shen, Deerfield, IL (US); Armando J. Castro, Westchester, IL (US); Michael Catizone, Plainfield, IL (US); Bruno Padovani, Naperville, IL (US); David G. Barkalow, Deerfield, IL (US); Xiaohu Xia, Evanston, IL (US); Michael S. Haas, Naperville, IL (US); Eric J. Dowd, Chicago, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/022,012

(22) Filed: Jan. 29, 2008

(65) Prior Publication Data
US 2008/0145477 A1 Jun. 19, 2008

Related U.S. Application Data

(63) Continuation-in-part of application No. PCT/US2007/016834, filed on Jul. 25, 2007.

(60) Provisional application No. 60/834,646, filed on Jul. 31, 2006.

(51) Int. Cl.
*A23G 4/00* (2006.01)

(52) U.S. Cl.
USPC .............................................................. 426/4

(58) Field of Classification Search
USPC .............................................................. 426/4
See application file for complete search history.

(56) References Cited

U.S. PATENT DOCUMENTS

| | | | |
|---|---|---|---|
| 4,828,845 A | 5/1989 | Zamudio-Tena et al. | |
| 4,844,926 A | 7/1989 | Hatanaka | |
| 5,126,151 A | 6/1992 | Bodor et al. | |
| 5,128,155 A | 7/1992 | Song et al. | |
| 5,145,708 A | 9/1992 | Patel et al. | |
| 5,217,735 A | 6/1993 | Zibell | |
| 5,366,740 A | 11/1994 | Shaw et al. | |
| 5,424,081 A | 6/1995 | Owusu-Ansah et al. | |
| 5,482,722 A | 1/1996 | Cook | |
| 5,552,163 A * | 9/1996 | Hartman et al. | 426/3 |
| 5,580,590 A | 12/1996 | Hartman | |
| 5,601,858 A | 2/1997 | Mansukhani et al. | |
| 5,672,367 A | 9/1997 | Grijpma et al. | |
| 6,017,566 A | 1/2000 | Bunczek et al. | |
| 6,159,447 A * | 12/2000 | Budny et al. | 424/49 |
| 6,190,705 B1 | 2/2001 | Richey | |
| 6,441,126 B1 | 8/2002 | Cook et al. | |
| 6,627,233 B1 | 9/2003 | Wolf et al. | |
| 6,733,578 B2 | 5/2004 | Liu et al. | |
| 6,773,730 B1 | 8/2004 | Liu et al. | |
| 6,949,264 B1 | 9/2005 | McGrew et al. | |
| 6,986,907 B2 | 1/2006 | Phillips et al. | |
| 7,022,352 B2 | 4/2006 | Castro et al. | |
| 7,070,818 B1 * | 7/2006 | Nielsen et al. | 426/3 |
| 2004/0022895 A1 | 2/2004 | Castro et al. | |
| 2004/0146599 A1 | 7/2004 | Anderson et al. | |
| 2004/0156949 A1 | 8/2004 | Andersen et al. | |
| 2004/0166197 A1 | 8/2004 | Ribadeau-Dumas et al. | |
| 2005/0025858 A1 | 2/2005 | Phillips et al. | |
| 2006/0141094 A1 | 6/2006 | Sato et al. | |
| 2006/0177383 A1 * | 8/2006 | Gebreselassie et al. | 424/49 |
| 2006/0263474 A1 | 11/2006 | Luo | |
| 2006/0263480 A1 * | 11/2006 | Boghani et al. | 426/5 |
| 2007/0104866 A1 | 5/2007 | McClements et al. | |

FOREIGN PATENT DOCUMENTS

| | | |
|---|---|---|
| EP | 0 252 374 A1 | 1/1988 |
| EP | 1 440 621 A1 | 7/2004 |
| WO | WO 92/19680 A1 | 11/1992 |
| WO | WO 98/17124 A1 | 4/1998 |
| WO | WO 98/58550 A1 | 12/1998 |
| WO | WO 99/39588 A1 | 8/1999 |
| WO | WO 01/47368 A1 | 7/2001 |
| WO | WO 01/52662 A2 | 7/2001 |
| WO | WO 02/076227 A1 | 10/2002 |
| WO | WO 03/015528 A1 | 2/2003 |
| WO | WO 03/088757 A1 | 10/2003 |
| WO | WO 2004/034804 A1 | 4/2004 |
| WO | WO 2005/063037 A1 | 7/2005 |
| WO | WO 2006/016179 A1 | 2/2006 |
| WO | WO 2007/143989 A1 | 12/2007 |
| WO | WO 2008/016540 A1 | 2/2008 |

OTHER PUBLICATIONS

Fereidoon Shahidi, ed. Baileys Industrial Oil and Fat Products. 2005. Published by John Wiley and Sons, Inc. vol. 3, Chapter 13. p. 402.*
"Polyvinylacetate". Retrieved on Sep. 25, 2012 from absoluteastronomy.com/topics/polyvinyl acetate. pp. 1-2.*
"Ingredient Breakdown (composition) EMULGUM—EMULPUR IP," Cargill Texturizing Solutions, 2 pages, Apr. 28, 2006.
Food Chemistry (3d Ed.), edited by Owen R. Fennema, Marcel Dekker, Inc., New York, New York, cover page, publication page, p. 231 (1996).
"De-Oiled Lecithin," Thar Technologies, 1 page (date unknown but presumed to be prior to Jul. 31, 2006).
Risch Sara J. "Chapter 1—Encapsulation: Overview of Uses and Techniques" in "In Encapsulation and Controlled Releases of Food Ingredients", ACS Symposium Series. Published by American Chemical Society. 1995, pp. 2-7.

* cited by examiner

*Primary Examiner* — D. Lawrence Tarazano
*Assistant Examiner* — Jenna A. Watts
(74) *Attorney, Agent, or Firm* — Steven P. Shurtz; Brinks Gilson & Lione

(57) ABSTRACT

A chewing gum comprises a primary chewing gum composition comprising gum base, a sweetener and a flavoring agent and a food acceptable delayed-release modification agent. The delayed-release modification agent reacts with the primary chewing gum composition after a chewed cud of the gum composition is formed, causing the primary gum to exhibit increased environmental acceptability after the chewed cud is discarded.

38 Claims, No Drawings

US 8,617,623 B2

CHEWING GUM WITH DELAYED-INTERACTION MODIFIER

CROSS-REFERENCE TO RELATED APPLICATIONS

The present application is a continuation-in-part of International Application Serial Number PCT/US07/016834, filed Jul. 25, 2007, which in turn claims priority to Provisional U.S. Patent Application Ser. No. 60/834,646, filed Jul. 31, 2006, both of which are hereby incorporated by reference in their entirety.

BACKGROUND OF THE INVENTION

The present invention relates to a chewing gum having increased environmental acceptability. In particular, it relates to a chewing gum product incorporating a delayed-release modification agent.

Chewing gum is a widely enjoyed confection product. However, chewing gum has an undesirable quality of sticking to substrates such as sidewalks or pavements after its use. Therefore, attempts have been made to formulate chewing gum compositions which break down after being used by a consumer. One approach has been to add a relatively large amount (typically around 5%) de-oiled lecithin to the chewing gum. Chewing gum with de-oiled lecithin results in gum cud that disintegrates and is less adhesive to a hard substrate such as concrete, brick, or stone. However, it has been found that such high levels of lecithin also cause the chewing gum product itself eventually to dissolve, even during storage and before chewing by a consumer.

Other attempted solutions to the problem have been to reformulate gum bases to be inherently less adhesive. Such chewing gum base components have included elastomers containing silica or fluorine which have markedly less adhesion than conventional gum bases. However, such elastomers have not achieved commercial success due to cost, regulatory problems or undesirable flavor.

Thus, it would be desirable to create a chewing gum product which exhibits increased environmental acceptability after use and also has a reasonable shelf life.

SUMMARY OF THE INVENTION

The present invention is a chewing gum comprising a primary chewing gum composition comprising a gum base, a sweetener and a flavoring agent, and a food-acceptable delayed-release modification agent. The delayed-release modification agent reacts or interacts with the primary chewing gum composition after a chewed cud of the gum composition is formed causing the primary chewing gum composition to exhibit increased environmental acceptability after the chewed cud is discarded.

DESCRIPTION OF THE INVENTION

In accordance with this invention, a chewing gum comprises a primary chewing gum composition comprising gum base, a sweetener and a flavoring agent and a food acceptable delayed-release modification agent. The delayed-release modification agent reacts with the primary chewing gum composition after a chewed cud of the gum composition is formed causing the primary gum to exhibit increased environmental acceptability after the chewed cud is discarded.

Within this invention, "increased environmental acceptability" means that the chewed gum cud has reduced tendency to (or does not) adhere as a mass to surfaces found in the environmental such as sidewalks, pavement, tables, chairs, desks, and the like for a prolonged period of time. In some embodiments, the cud will be exhibit reduced adhesion so that it will not adhere or will adhere only weakly to the surface and can be easily removed as an intact mass by intentional cleaning or by exposure to natural environmental factors. In other embodiments, the cud will disintegrate over time into small particles and become unobjectionable whether they adhere or not. In still other embodiments, at least some ingredients in the cud will degrade biologically or chemically to substances which are naturally present in the environment or which are themselves susceptible to further degradation by natural biological or environmental processes.

A "cud" is a gum base mass produced by chewing.

In one embodiment, the modifier is selected from the group comprising emulsifiers, surfactants, enzymes and alkalis.

In another embodiment, the modifier is not an emulsifier or a surfactant.

In another embodiment, the modification agent is encapsulated in an encapsulant to achieve delayed release.

In another embodiment, the gum base is an environmentally friendly gum base. In such cases the environmental acceptability of the chewed cud is further enhanced or improved by the present invention.

In another embodiment, the delayed-release modification agent is an encapsulated lecithin material. Suitable encapsulated lecithin materials include a first component including a lecithin material and a second component encapsulating the first component.

In another embodiment, a method of increasing the environmental acceptability of a chewing gum comprises the steps of providing a primary chewing gum formulation having as ingredients a gum base, a flavoring agent and a sweetener and adding a food-acceptable delayed-release modification agent to the primary chewing gum formulation.

In an embodiment, the present invention comprises a method of increasing environmental acceptability of a chewing gum comprising the steps of adding to a primary chewing gum composition a gum base, a flavoring agent, and a sweetener and a food-acceptable delayed-release modification agent. In a further embodiment, the primary chewing gum formulation is known or has been sold.

The foregoing and other features and advantages of the present invention will become apparent from the following detailed description of the presently preferred embodiments, when read in conjunction with the accompanying examples.

In this description of the invention, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

A modification agent suitable for use in this invention, is a material effective to cause a gum cud to exhibit increased environmental acceptability after use either by direct chemical reaction or indirectly through initiation of chemical reactions or through a physical interaction (such as emulsification) with the primary chewing gum components. A suitable modification agent may be a food-acceptable compound or combination of ingredients which react or interact with one or more of the primary chewing gum ingredients to render the chewed cud more environmentally acceptable after it has been discarded. The modification agent may be a degradation agent which reacts chemically with a targeted ingredient to degrade it, i.e. break covalent bonds. Alternatively, the modification agent may be a disintegration agent which interacts to cause physical separation of a targeted ingredient from the remainder of the primary chewing gum ingredients, for example by altering its solubility or rendering it incompatible. In some embodiments, the modification agent may be a release agent which acts on the chewed gum cud as a whole to render it less adhesive. In some cases, the modification agent may act in more than one way to achieve the intended result of making the chewing gum composition more environmentally acceptable after it has been chewed and discarded.

It is important that the modifier be selected in consideration of the formulation of the gum base. For example, a protease enzyme is effective to degrade a proteinaceous gum base but would have no effect on a conventional gum base. Furthermore, it is important that the modification agent be food acceptable in its nature and in quantities which are effective for the intended use. By "food acceptable" it is meant that the substance or substances may be ingested by humans without harm.

Modification agents specifically contemplated for use in the present invention include emulsifiers and surfactants which can solubilize or bind moisture to fats making them incompatible with other gum base ingredients. Examples of emulsifiers include lecithin, hydrolyzed lecithin, phosphatidyl serine, monoglycerides and ionic or non-ionic surfactants. Particularly preferred emulsifiers include lecithins with high (at least 50%) content of hydrophilic fractions such as phosphatidyl choline, phosphatidyl serine, phosphatidyl inositol and phosphatidic acid.

Alternatively, the modification agent may be a compound or blend other than an emulsifier or surfactant. An example would be enzymes which degrade certain gum base ingredients causing disintegration of the chewed cud. Suitable enzymes include lipases which degrade fats, amylases which can degrade starches used in certain biodegradable gum bases and proteases which can degrade proteins used in certain biodegradable gum bases.

Alternatively, the modification agent may be an alkaline material, such as alkali metal salts. Alkalis can hydrolyze polyvinylacetate, a common gum base ingredient, causing it to disintegrate or to attract and hold water thus making it incompatible with the other gum base ingredients. Examples of alkalis which may be employed include carbonates and hydroxides of sodium, potassium and magnesium.

Yet another type of materials which can function as a modification agent are hydrophilic polymers such as hydroxypropylcellulose (HPC) and other hydrophilic cellulose derivatives. When incorporated into a chewing gum, HPC binds moisture into the cud causing softening and eventually disintegration of the chewed cud. In this way, they may act much like emulsifiers and are included in the term "emulsifier" for purposes of this invention.

It will be appreciated that it may be advantageous to combine two or more modification agents into the same chewing gum. Such combinations may be incorporated into a single encapsulation or into separate encapsulations where encapsulation is used as a delayed-release mechanism. It will generally be advantageous to multiple use modification agents which act in complimentary ways to increase the environmental acceptability of the chewed cud.

It is desirable that the delayed-release modification agent be compatible with the flavoring agent, sweetener and other components of the primary chewing gum composition. By compatible, it is meant that the modification agent will not have significant negative impact on the sensory properties of the chewing gum when it is chewed. Such negative impact might be either direct, for example, by having an undesirable flavor or indirect, for example, by reacting chemically with the flavoring agent or sweetener. However, it may not always be possible to select appropriate modification agents which entirely avoid this problem, so alternative means of reducing this negative impact may be employed. Such means include encapsulation or isolation of a flavor or sweetener to reduce the chances of a chemical reaction and/or to delay the release of flavor and sweetness to better mask an off-flavor. Suitable means of isolation include incorporating the flavor or sweetener and/or flavor into other phases of the product (such as into a coating layer or liquid center) Suitable means of encapsulating the flavor or sweetener involve use of known technologies such as that disclosed in U.S. Pat. No. 5,128,155 and U.S. Pat. No. 5,217,735, which are hereby incorporated by reference.

In this invention, a delayed release modification agent reacts with a primary chewing gum composition after a chewed cud is formed. In the context of the present invention, delayed-release means that the modification agent is physically or chemically prevented from substantially interacting or reacting with the targeted primary chewing gum components prior to initiation of chewing by a consumer. Preferably, a suitable modification agent is prevented from substantially reacting or interacting with the targeted primary chewing gum components until after the gum has been chewed and discarded. Preventing a modification agent from substantially interacting or reacting with the targeted primary chewing gum components, means that any interaction which might occur prior to completion of chewing should not produce noticeable or objectionable changes in the sensory properties of the gum. While any method of delaying the interaction is effective, specifically contemplated methods include: encapsulation wherein the modification agent is substantially surrounded by an encapsulant; separation wherein the modification agent is isolated in a separate phase (for example in a coating or a liquid fill) from the targeted primary chewing gum ingredients; and immobilization wherein reaction is prevented due to restricted mobility of the modification agent and/or the targeted primary chewing gum ingredient such as by covalently bonding the modification agent to a matrix such as polyacrylate.

Thus, through use of a delayed release modification agent in this invention, a modification agent does not contact, react with, or initiate a reaction with a gum base composition at least until a cud is formed in the mouth of a consumer. In some cases, initiation of the reaction occurs as a result of chewing, either by mechanical action of chewing itself or by exposure to saliva which is incorporated into the cud during the chewing process. Preferably, such contact, reaction or initiation of a reaction does not begin until after the cud is discarded into the environment. In such cases, the initiation of the reaction may occur as a result of exposure to environmental elements such as water, oxygen or ultraviolet light.

In one preferred embodiment, the present invention the delayed-release modification agent is an immobilized lipase or esterase enzyme. Without wishing to be bound by theory, it is believed that elastomers (for example, butyl rubber and polyisobutylene) and polar resin (for example, polyvinyl acetate) are made mutually compatible by the addition of plasticizers. The specific plasticizers are selected based on how near their solubility parameters are to the parameters of each polymer. The result is an increase in polymer solubility which promotes a forced macro-homogeneity as evidenced through the reduction and merging of their respective glass transition temperatures ($T_g$).

Triglycerides (partially hydrogenated vegetable oils) are one of the primary compatibilizers for PVAc with monoglycerides, diglycerides and acetylated mono glycerides also providing some degree of plasticization/softening. However unlike triglycerides, monoglycerides and acetylated monoglycerides also have emulsification properties. As emulsifiers, these materials promote moisture uptake by the triglycerides. In excess, this emulsification causes the fats to become segregated from the base blend, disrupting the polymer homogeneity and causing the chewing gum to have an overly soft texture or actually dissolve in the mouth.

This emulsification can also make the chewed cud easier to remove from environmental surfaces through mechanical action. In the present invention, esterase or lipase enzyme can be immobilized on to an insoluble matrix so that the enzyme will not release from gum base when chewed. When hydrated during chewing and/or exposure to environmental moisture, the enzyme hydrolyzes triglycerides and other softening agents reducing the level of existing compatibilizers and generating high levels of emulsifying monoglycerides. The result is an in situ reaction that acts to drive the polymer blend apart and continues post expectoration of the gum cud. This incompatibilization increases removability and can even result in disintegration and effective self-removal of the cud from hard surfaces.

Suitable modifiers incorporated into a gum composition in accordance with this invention are present in an amount sufficient to initiate or complete a transformation into a more environmentally acceptable form. Typically, a sufficient amount is at least 0.5 wt. % and preferably at least 2 wt. % of the total chewing gum composition and may range up to about 10 wt. %, preferably up to about 5 wt. % of the total chewing gum composition.

In an embodiment, a delayed-release modification agent is encapsulated. Encapsulation means that a modification agent such as a lecithin material is coated with, or otherwise forms a matrix with, another material (i.e. an encapsulant) to provide a barrier around at least a portion of the modification agent. A modification agent which has been encapsulated to function as a delayed release agent is referred to as an "encapsulated modifier."

The encapsulant may be any suitable material. A suitable encapsulant separates a modification agent from a gum base to prevent substantial interaction prior to initiation of chewing. After initiation of chewing or after discard of a chewed cud, a suitable encapsulant changes form such that the modifier agent may interact with a gum base. An amount of encapsulant used is determined by the amount required to release the modifier agent to react with a gum base in accordance with this invention.

The encapsulant may be selected from corn syrup solids, gum acacia, hydrocolloids (including natural gums such as agar, alginates, guar gum, gum Arabic, locust bean gum, gellan gum, cellulose derivatives, and gelatin), polysaccharides (such as maltodextrin, corn syrup solids, modified and gelatinized starches), polymers such as polyvinyl acetate, polyvinyl laurate, polyvinyl stearate, vinylacetate-vinyllaurate copolymer, shellac or a protein (including gluten, gelatin and zein) or a wax. The encapsulant also may include a processing aid such as a sugar (such as sucrose, fructose, glucose, galactose, maltose, lactose, and mixtures thereof) or a polyol (such as sorbitol, maltitol, xylitol, erythritol, lactitol, isomalt, and mixture thereof) or a plasticizer or filler. The encapsulating material may be water soluble or water insoluble. Water insoluble encapsulants are preferred because they are more likely to delay the release of the modification agent well into, if not beyond the period of time in which the chewing gum is being chewed.

It has been found that spray drying is a suitable method for encapsulating the modification agent. In spray drying, the material is prepared by spraying a composition including the modification agent and a carrier such as corn syrup solids, gum acacia, hydrocolloids, polysaccharides, proteins, or mixtures thereof. In one embodiment, the encapsulated material may be prepared by the spray drying technique disclosed in U.S. Published Application 2004/0022895, the contents of which are hereby incorporated by reference herein. The water content of the spray dried material should be about 1% to 5% and preferably 1% to 3%. Due to its water soluble nature, after the gum is chewed in the mouth of a user, the carrier dissolves into saliva.

A second material may be added to the carrier material to aid in the spray drying or other encapsulation technique. The second material may be a sugar (such as sucrose, fructose, glucose, galactose, maltose, lactose, and mixtures thereof) or a polyol (such as sorbitol, maltitol, xylitol, erythritol, lactitol, and isomalt), or mixtures thereof. Sorbitol may be particularly effective because it is less hygroscopic than some of the other materials.

In some embodiments, an encapsulated modifier may include between about 20% and about 80% modification agent by weight, between about 20% and about 70% of the carrier material by weight, and between about 2% and about 30% of the second material by weight. In another embodiment, the encapsulated modifier may include between about 30% and about 70% modification agent by weight, between about 20% and about 50% of the carrier material by weight, and between about 5% and about 20% of the second material by weight.

In another embodiment, a modification agent may be about 1 to about 70% by weight, preferably about 5 to about 50% by weight, of the encapsulated modifier.

In another embodiment, a modification agent may be about 10 to about 35% by weight of the encapsulated modifier.

In an embodiment, the modification agent (separate form any encapsulant present) may be present at a level of about 0.5 to about 10 wt. %, preferably 1 to about 7 wt. % of the chewing gum composition.

In an embodiment, the modification agent (separate form any encapsulant present) may be present at a level of about 2 to about 5 wt. % of the chewing gum composition.

In one method of spray drying, a mixture of 40 wt. % to 60 wt. % modification agent, 20 wt. % to 50 wt. % gum acacia, and 2-20% sorbitol is blended to a solids level of about 20 wt. % to 30 wt. % in water and heated to about 30-40° C. for spray drying. Spray drying is done using an atomizing spraying nozzle and an inlet temperature above 165° C. In one embodiment, the resulting encapsulated modification agent was 59 wt. % de-oiled lecithin, 29 wt. % gum acacia, and 12 wt. % sorbitol, and a moisture content of 1.6 wt. %.

The modification agent also may be encapsulated by fluid bed coating. In fluid bed coating, particles of the modification agent are suspended in a stream of air. A liquid containing the encapsulating or coating material is sprayed into the fluidized particles, coating the particles. Coating levels may range from 5% to 80% (by weight), depending on the substrate's particle size and the degree of coating desired. A bottom spray or Wurster coater is preferably used. This type of coater is known in the art. The Wurster coater includes a generally cylindrical coating chamber surrounding a separate cylinder in the core, known as a partition. A nozzle is partitioned in the core of a plate under the partition to spray a liquid upwardly through the partition. Air flow is directed through the partition, transporting the substrate past the nozzle which sprays concurrently into the fluidized material.

Additional methods of encapsulation such as spray chilling, freeze drying, granulation, agglomeration, melt processing (i.e. mixing the modification agent into a melted encapsulant, solidifying and grinding), complexation (for example, in cyclodextrin) and complex coacervation may also be employed.

In an embodiment of the present invention, a modification agent is an emulsifier, which acts to bind water to fats or other compatibilization components to destroy cohesion of the gum base. The preferred emulsifier is a lecithin material. The encapsulated material may be added to a food product, such as candy or chewing gum. As used herein, the term "lecithin material" includes both lecithin and de-oiled lecithin. Lecithin is a mixture of phospholipids in oil. De-oiled lecithin is a lecithin material from which most of the oil has been removed. De-oiled lecithin includes primarily phospholipids, but also some glycolipids, carbohydrates, and a small amount of triglycerides. For example, a typical de-oiled lecithin material may include 70-80% phospholipids, 10-15% glycolipids, 5-10% carbohydrates, and about 2% triglycerides. De-oiled lecitihin is available from Cargill, with products including EMULGUM™ and EMULPUR IP™.

Encapsulated lecithin material, or other encapsulated modification agent, may be mixed with a primary chewing gum composition which comprises a gum base, a flavoring agent and a sweetener to form a chewing gum. Where encapsulated lecithin replaces conventional lecithin materials in chewing gum, the level of lecithin in the chewing gum is typically about 0.1% to about 1%. In special formulations such as non-stick gum products, higher levels of lecithin may be used, and encapsulated lecithins may be preferred. The encapsulated lecithin material may provide between about 1% to about 12%, and preferably about 4% to about 8%, lecithin material in the chewing gum composition.

Encapsulated lecithin material particularly is useful for adding to a chewing gum material. Lecithin previously has been added to many food products, and has been added to chewing gum products as a softener. De-oiled lecithin also has been added (in larger amounts) to chewing gums to provide a product that would be easy to remove from a substrate after used by a consumer. However, it has been found that the de-oiled lecithin interacts in an undesirable way with the gum base during gum storage. This interaction later causes dissolution of the chewing gum cud when the gum is chewed. It is believed that the interaction may be the lecithin molecules diffusing into the rubber network driven by the affinity of lecithin and base ingredient (rubber, fats, and oil) to reach thermodynamic equilibrium. When water, such as saliva, is introduced into this lecithin-diffused rubber network, the rubber network is emulsified, and readily falls apart, results in dissolution of the chewing gum during chewing.

It has been found that by encapsulating the lecithin material or other modification agent with an encapsulant, the modification agent can be protected from interacting with the gum base during storage, while providing a product that would be easy to remove from a substrate after being discarded by a consumer. When chewed in the mouth of a user, or afterwards, the encapsulating component dissolves or ruptures, thus freeing the modification agent. The resulting gum cud can easily be removed after use from surfaces such as concrete. Alternatively, the cud may disintegrate of release without further human action depending on the action of the modification agent on the cud.

Additional materials may be included and encapsulated with the lecithin or other modification agent. These materials include sweeteners. However, the encapsulated modification agent in the chewing gum or other food product may also be free from any significant amount of sweetener.

High-intensity sweeteners which may be used in chewing gum or other food products include, but are not limited to, sucralose, aspartame, N-substituted aspartame derivatives such as neotame, acesulfame acid or its salts, alitame, saccharin and its salts, cyclamic acid and its salts, glycyrrhizinate, dihydrochalcones, thaumatin, monellin, monatin; and aminoacid-, dipeptide-, peptide-, and protein-based sweeteners, and the like, alone or in combination. The sweetener may be encapsulated with the modification agent, encapsulated separately and/or added directly with the other gum components.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. The insoluble gum base may constitute between about 5% and about 95% by weight of the gum. More preferably the insoluble gum base comprises between about 10% and about 50% by weight of the gum, and most preferably between about 20% and about 35% by weight of the gum.

The gum base typically also includes a filler component. The filler component may be calcium carbonate, magnesium carbonate, talc, dicalcium phosphate or the like. The filler may constitute between about 5% and about 60% by weight of the gum base. Preferably, the filler comprises about 5% to about 50% by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

While the chewing gum of the present invention may use conventional gum bases and primary gum formulation in some embodiments the invention will use special environmentally friendly gum bases or gum formulas which are intended to have increased environmental acceptability. In general, such formulations reduce the problem of adherence to environmental surfaces by being inherently less adhesive, being biodegradable or being susceptible to disintegration.

Reduced adhesion gum bases, which are also called removable gum bases, may be formulated using conventional gum base ingredients or specially constructed polymers such as silicated or fluoridated polymers. Examples of such gum bases include: U.S. Pat. No. 5,601,858; WO 03-088757 and WO 06-016179, all incorporated by reference herein.

Biodegradable gum bases typically comprise digestible materials such as modified or unmodified proteins and starches of specially constructed polymers which can be consumed by bacteria. Examples of such bases are disclosed in U.S. Pat. No. 5,366,740; U.S. Pat. No. 5,424,081; U.S. Pat. No. 5,482,722; U.S. Pat. No. 5,580,590; U.S. Pat. No. 5,672,367; U.S. Pat. No. 6,441,126; U.S. Pat. No. 6,733,578; U.S.

Pat. No. 6,773,730; WO 92-019680; WO 04-034804; WO 98-017124; WO 98-058550; WO 99-039588; and WO 01-047368, all incorporated by reference herein.

One type of particularly preferred environmentally friendly chewing gum base formulation is disclosed in U.S. Pat. No. 6,986,907, which is incorporated by reference herein. This formulation uses a combination of high molecular weight (200,000 to 600,000) polyisobutylene and less than 5% of non-silica filler.

Certain elastomers or additives are said to be capable of causing the physical disintegration of discarded gum cuds. Examples are disclosed in U.S. Pat. No. 4,156,949 and EP 1,440,621, all incorporated by reference herein.

The water-soluble portion of a chewing gum typically comprises softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5% and about 15% by weight of the chewing gum. Softeners include glycerin, lecithin and combinations thereof. Further, aqueous sweetener solutions such as those containing sorbitol, hydrogenated starch hydrolyzates, corn syrup and combinations thereof may be used as softeners and binding agents in gum. The use of water soluble plasticizers is generally preferred in the present invention as they are removed from the gum cud during chewing and therefore do not plasticize the gum base which can increase adhesiveness of the discarded cud making it harder to remove from environmental surfaces.

The primary chewing gum composition also includes one or more flavoring agents. The term "flavoring agent" is meant to include flavors, cooling agents, sensates, and the like. Flavoring agents include essential oils, synthetic flavors, or mixtures thereof including, but not limited to oils derived from plants and fruits such as citrus oils, fruit essences, peppermint oil, spearmint oil, clove oil, oil of wintergreen, anise, and the like. Artificial flavoring components also are contemplated for use in the food products of the present invention. Dry flavors such as menthol or dried flavor blends of oils or fruit essences are contemplated for the present invention. Liquid flavors may be blended with the sweetener. Those skilled in the art will recognize that natural and artificial flavoring agents may be combined in any sensorally acceptable blend. All such flavors and flavor blends are contemplated by the present invention.

The flavoring agent may further comprise one or more physiological cooling agents. A variety of physiological cooling agents are discussed in U.S. Pat. No. 6,627,233, the contents of which are hereby incorporated by reference herein. Physiological cooling agents include substituted p-menthane carboxamides (such as WS-3); acyclic carboxamides (such as WS-23); menthone glycerol ketal; menthyl lactate; menthyl succinate; and 3-I-menthoxypropane-1,2-diol.

Sensates may also be used as flavoring agents and include cooling agents, and pungent, hot, and tingling flavors.

Flavoring agents may also serve as plasticizers for the gum base. While this can be desirable in some cases, in some embodiments of the present invention, it is desirable to reduce plasticization of the gum base because softer gum base tends to be more adhesive and harder to remove from environmental surfaces. For this reason, it is advantageous to isolate the flavor from the gum base. This may be accomplished by several means, most notably spray drying or otherwise encapsulating at least a portion (preferably a major portion) of the flavor or absorbing it onto a carrier such as silica. Alternatively, all or a portion of the flavor may be moved out of the gum mass and into a separate phase of the chewing gum product such as into the coating or a liquid fill in products which include these phases.

Optional ingredients such as colors, emulsifiers and pharmaceutical agents may be added to the chewing gum.

A primary chewing gum composition suitable for use in this invention preferably includes water soluble bulk sweeteners which contribute sweetness and bulk to the product. Sugarless bulk sweeteners include components with sweetening characteristics roughly comparable to sugars but which are devoid of the commonly known sugars. These include, but are not limited to, sugar alcohols such as sorbitol, mannitol, xylitol, erythritol, isomalt, hydrogenated starch hydrolyzates, maltitol and the like, alone or in any combination.

Sugar bulk sweeteners include, but are not limited to, sucrose, dextrose, maltose, dextrin, dried invert sugar, fructose, levulose, galactose, corn syrup solids, and the like, alone or in combination.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets. A pellet center may be coated with a hard shell coating that may also contain flavoring agents to give a fast release of flavor initially. Alternatively, or in addition, a liquid center fill may be coextruded with the gum mass to produce a center filled product.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further portions of the bulking agent may then be added to the mixer. A flavoring agent is typically added with the final portion of the bulking agent. The delayed-release modification agent is preferably added with the final portion of the bulking agent and before the flavor is added.

The entire mixing procedure typically takes from five to fifteen minutes, but longer mixing times may sometimes be required. Those skilled in the art will recognize that many variations of the above described procedure may be followed.

EXAMPLES

The following examples of the invention and comparative examples are provided by way of explanation and illustration.

Chewing gum samples were prepared by a process using various compositions according to the present invention, as well as comparative examples. The chewing gum samples were tested for mouth dissolvability as well as removability from a substrate.

Chewing gum compositions were prepared using the formulations in Tables 1-3.

TABLE 1

Comparative Formulations

| Ingredient | Comparative Example A | Comparative Example B | Comparative Example C |
|---|---|---|---|
| Sucrose | 60.93 | 62.35 | 62.35 |
| Gum base | 19.95[a] | 16[b] | 16[a] |
| Corn Syrup (19.95% water) |  | 15 | 15 |

TABLE 1-continued

Comparative Formulations

| Ingredient | Comparative Example A | Comparative Example B | Comparative Example C |
|---|---|---|---|
| Corn Syrup (14.9% water) | 16.6 | | |
| De-oiled lecithin | | 5 | 5 |
| Peppermint flavor | 0.9 | 0.9 | 0.9 |
| Menthol | | 0.15 | 0.15 |
| Color | | 0.6 | 0.6 |
| Glycerin | 1.4 | | |
| Water | 0.22 | | |

[a] palm oil base
[b] soy oil base

TABLE 2

Formulations of Examples 1-5

| Ingredient | Example 1 | Example 2 | Example 3 | Example 4 | Example 5 |
|---|---|---|---|---|---|
| Sucrose | 48.35 | 56.35 | 61.15 | 55.15 | 60.65 |
| Base | 16[a] | 16[a] | 16[b] | 16[a] | 16[a] |
| Corn Syrup (19.95% water) | 15 | 15 | 15 | 15 | 15 |
| Encapsulated de-oiled lecithin | 15 | 10 | 5 | 11 | 5.5 |
| Peppermint flavor | 0.9 | 0.9 | 0.9 | 0.9 | 0.9 |
| Menthol | 0.15 | 0.15 | 0.15 | 0.15 | 0.15 |
| Color | 0.6 | 0.6 | 0.6 | 0.6 | 0.6 |
| Glycerin | 2.0 | | | | |
| Water | 2 | 1 | 1.2 | 1.2 | 1.2 |

[a] palm oil base
[b] soy oil base

TABLE 3

Formulations of Examples 6-11

| Ingredient | Example 6 | Example 7 | Example 8 | Example 9 | Example 10 | Example 11 |
|---|---|---|---|---|---|---|
| Sucrose | 57.65 | 57.65 | 61.9 | 57.65 | 52.43 | 55.15 |
| Base | 16[b] | 16[b] | 16[b] | 16[a] | 19.95[a] | 16[a] |
| Corn Syrup (19.95% water) | 15 | 15 | 15 | 15 | 16.83 | 15 |
| Encapsulated de-oiled lecithin | 8.5 | 8.5 | 4.25 | 8.5 | 8.5 | 11 |
| Peppermint flavor | 0.9 | 0.9 | 0.9 | 0.9 | 0.9 | 0.9 |
| Menthol | 0.15 | 0.15 | 0.15 | 0.15 | | 0.15 |
| Color | 0.6 | 0.6 | 0.6 | 0.6 | 0.6 | 0.6 |
| Glycerin | | | | | | |
| Water | 1.2 | 1.2 | 1.2 | 1.2 | | 1.2 |

[a] palm oil base
[b] soy oil base

Comparative Example A contained no lecithin. Comparative Examples B and C contained de-oiled lecithin (unencapsulated) at 5%. Examples 1-11 contained de-oiled lecithin encapsulated with gum acacia (and in some cases, additionally sorbitol), as shown in Table 4 below. For Examples 1-11, the encapsulated de-oiled lecithin was prepared by spray drying lecithin, gum acacia, and optionally sorbitol in the stated ratios. For example, lecithin:acacia:sorbitol at a 10:10:2 ratio means that the spray drying formulation contained 10 parts by weight lecithin, 10 parts by weight acacia, and 2 parts by weight sorbitol. The encapsulated de-oiled lecithin was then added to the other components of the chewing gum composition.

TABLE 4

Lecithin Content of Examples

| Example | Lecithin Content |
|---|---|
| Comparative Example A | None |
| Comparative Example B | De-oiled lecithin at 5% |
| Comparative Example C | De-oiled lecithin at 5% |

TABLE 4-continued

Lecithin Content of Examples

| Example | Lecithin Content |
|---|---|
| Example 1 | Spray-dried de-oiled lecithin:acacia at a 1:2 ratio at 15%. |
| Example 2 | Spray-dried de-oiled lecithin:acacia at a 1:1 ratio at 10%. |

TABLE 4-continued

Lecithin Content of Examples

| Example | Lecithin Content |
|---|---|
| Example 3 | Spray-dried de-oiled lecithin:acacia at a 1:1 ratio at 5%. |
| Example 4 | Spray-dried de-oiled lecithin:acacia: sorbitol at 10:10:2 ratio 11%. |
| Example 5 | Spray-dried de-oiled lecithin:acacia: sorbitol at a 10:10:2 ratio at 5.5%. |
| Example 6 | Spray-dried de-oiled lecithin:acacia: sorbitol at a 10:5:2 ratio at 8.5%. |
| Example 7 | Spray-dried de-oiled lecithin:acacia: sugar at a 10:5:2 ratio at 8.5%. |
| Example 8 | Spray-dried de-oiled lecithin:acacia: sugar at a 10:5:2 ratio at 4.25%. |
| Example 9 | Spray-dried de-oiled lecithin:acacia: sugar at a 10:5:2 ratio at 8.5% |
| Example 10 | Spray-dried de-oiled lecithin:acacia: sugar at a 10:5:2 ratio at 8.5%. |
| Example 11 | Spray-dried de-oiled lecithin:acacia: sorbitol at a 10:10:2 ratio at 5.5%. |

Dissolvability Test

After the chewing gum samples were prepared, they underwent accelerated aging at conditions of 45° C. and 85% relative humidity. Samples were tested after conditioning for 1 week, 2 weeks, and/or 3 weeks. The chewing of chewing gum by a consumer was simulated using a gum dissolution by lipase test. This test is conducted as follows. A gum sample is placed in a Brabender mixer with frequent addition of lipase solution, simulating the mouth chewing action. The lipase time is recorded as the time elapsed before the test sample falls apart in the brabender mixer. A four hour lipase time is considered as passing, since a sample lasting that long would have little chance of dissolving in a consumer's mouth. A longer lipase time indicates better resistance to gum dissolution.

Dissolvability tests were carried out using the chewing gums of Comparative Examples B and C and Examples 1, 4, 6-9, and 11. Table 5 shows the lipase time, which is the time elapsed before the test sample falls apart in the Brabender mixer. The longer lipase time for the Examples 1, 4, 6-9, and 11 compared to Comparative Examples B and C indicates that the encapsulated de-oiled lecithin prevents the lecithin from dissolving the gum base when the gum is chewed by a consumer.

TABLE 5

Lipase Test

| Example | 1 week | 2 weeks | 3 weeks |
|---|---|---|---|
| Comparative Example B | 2:15 | 1:30 | 1:03 |
| Comparative Example C | 1:32 | 0:57 | |
| Example 1 | PASS | | |
| Example 4 | PASS | PASS | 3:40 |
| Example 6 | PASS | 3:29 | 3:49 |
| Example 7 | PASS | 3:17 | 2:40 |
| Example 8 | PASS | PASS | 3:25 |
| Example 9 | PASS | 3:04 | |
| Example 11 | PASS | PASS | 3:08 |

Removability Tests

After the dissolvability test, the removability of the chewing gum samples was tested for Comparative Example A (containing no lecithin), Comparative Example C (containing unencapsulated lecithin), and Example 11 (containing encapsulated lecithin) using two standard gum removability tests. The samples were prepared as follows. One stick of gum or two pellets of gum were chewed for 12 minutes and then placed in water at about 13-21° C. for several minutes. The gum cud was then placed on a concrete surface such as a concrete paver. The pavers were kept at room temperature for 24 hours before gum application. A release paper (2"×2") was placed on top of the gum cud. Then two additional pavers were placed on top and the gum was sandwiched in between two pavers. Pavers with gum cuds were placed in oven at 32° C. for 24 hours. After the gum reached room temperature, the top two pavers and then the release paper were removed. Gum cuds were allowed to age for 3 days. Gum cud was placed on a concrete substrate, and aged for 3 days before testing.

In the mechanical sweeper test, a mechanical sweeper (Tennant 5700 XP) was used. One dry pass and four wet passes with the mechanical sweeper were made over the gum. After the wet passes, the gum was visually assessed to determine the amount of gum cud removed. In the simulated rain test, the condition of the gum cud was assessed after putting the sample under running water for 24 hours. The evaluation of gum removability relies on a visual assessment in comparison to a reference sample: 0% indicates "no removal," and 100% indicates "total removal." The results of these tests are shown in Table 6 below.

As shown below in Table 6, it can be seen that Example 11, which contained encapsulated de-oiled lecithin, had good removability. Comparative Example C, with unencapsulated lecithin, also had good removability. Comparative Example A, which contained no de-oiled lecithin, was not removed at all by the tests.

TABLE 6

Removability from Substrate

| | Sweeper Test | Simulated "rain" condition test |
|---|---|---|
| Comparative Example A | 0% | 0% |
| Comparative Example C | 57% | 100% |
| Example 11 | 47% | 100% |

Thus, it can be seen that chewing gum products incorporating encapsulated de-oiled lecithin provided acceptable mouth dissolvability as well as removability from a substrate.

Illustrative Example 12

A chewing gum can be made using a hydrolyzed zein gum base and gum formulation according to Example 12 of U.S. Pat. No. 6,773,730. In addition to the specified ingredients, an encapsulated protease enzyme can be prepared by spray chilling 25% protease enzyme in 75% high-melting wax. The encapsulated enzyme is added along with the flavor and acesulfame sweetener at a level of 10% of the primary chewing gum composition. The chewed cuds of this composition will exhibit improved degradation after they are discarded.

Illustrative Example 13

A chewing gum can be made using a gluten gum base according to Example 21 of U.S. Pat. No. 5,366,740. In addition to typical amounts of sorbitol, mannitol, aspartame and peppermint flavor, an encapsulated protease enzyme can be prepared by fluidized bed coating 30% protease enzyme with 70% shellac. The encapsulated enzyme is added at the end of the mix cycle with the flavor and aspartame at a level of 10% of the primary chewing gum composition. The chewed cuds of this composition will exhibit improved degradation after they are discarded.

Illustrative Example 14

A chewing gum can be made using the environmentally friendly gum base system and gum formulation according to Example 118 of US 2004/0156949. (Hydrogenated palm oil is used as the softener system) In addition to the specified ingredients, an encapsulated lipase enzyme can be prepared by spray drying 25% lipase enzyme in 75% maltodextrin. The encapsulated enzyme is added along with the flavor and high intensity sweeteners at a level of 10% of the primary chewing gum composition. The chewed cuds of this composition will exhibit improved degradation after they are discarded.

Illustrative Example 15

The chewing gum of Example 10 is followed except that the encapsulated de-oiled lecithin is replaced by encapsulated hydrolyzed deoiled lecithin (50% active).

Illustrative Example 16

The chewing gum of Example 10 is followed except that the encapsulated de-oiled lecithin is replaced by encapsulated phosphatidyl serine (50% active).

Illustrative Example 17

The chewing gum of Example 10 is followed except that the encapsulated de-oiled lecithin is replaced by encapsulated phosphatidyl inositol (50% active).

Illustrative Example 18

The chewing gum of Example 10 is followed except that the encapsulated de-oiled lecithin is replaced by encapsulated phosphatidyl choline (50% active).

Illustrative Example 19

The chewing gum of Example 10 is followed except that the encapsulated de-oiled lecithin is replaced by encapsulated phosphatidic acid (50% active).

Illustrative Example 20

The chewing gum of Example 10 is followed except that the encapsulated de-oiled lecithin is replaced by encapsulated lipase (50% active).

Illustrative Examples 21-23

Environmentally friendly chewing gums with improved environmental acceptability can be prepared according to the following formulations:

TABLE 7

Environmentally friendly primary chewing gum compositions

| | Illustrative Ex. 21 | Illustrative Ex. 22 | Illustrative Ex. 23 |
|---|---|---|---|
| Gum Base Formulations | | | |
| Elastomer of WO 06-016179 | 12.0% | — | — |
| Elastomer of U.S. Pat. No. 6,017,566 | — | 12.0% | — |
| Butyl Rubber | — | — | 2.1% |
| Polyisobutylene (200,000 MW) | — | — | 8.8% |
| Polyvinyl Acetate (Medium Molecular Weight) | 25.0% | 25.0% | 35.3% |
| Hydrogenated vegetable oil | 14.0% | 14.0% | 16.3% |
| Calcium Carbonate | 20.0% | 20.0% | 2.1% |
| Terpene Resin | 22.0% | 22.0% | 29.7% |
| Glycerol monostearate | 5.0% | 5.0% | 5.7% |
| Lecithin | 2.0% | 2.0% | — |
| Total | 100.0% | 100.0% | 100.0% |
| Chewing Gum Formulations | | | |
| Gum Base | 27.0% | 27.0% | 27.0% |
| Sorbitol | 50.4% | 53.4% | 47.4% |
| Hydrogenated Starch Hydrolysate (85% syrup) | 7.5% | 7.5% | 7.5% |
| Glycerin | 4.0% | 4.0% | 4.0% |
| Peppermint Flavor | 1.1% | 1.1% | 1.1% |
| PVAc Encapsulated Sodium Carbonate (25% active) | 10.0% | — | 3.0% |
| Immobilized Lipase Enzyme on Polyacrylate | — | 7.0% | 3.0% |
| Spray dried de-oiled phosphatidyl serine (25% active) | — | — | 7.0% |
| Total | 100.0% | 100.0% | 100.0% |

Illustrative Examples 24-27

Encapsulated hydroxypropylcellulose is used as a delayed-release modification agent in the formulas presented in Table 8. It is believed to function similarly to an emulsifier.

TABLE 8

Examples using encapsulated hydroxypropylcellulose as a delayed-release modification agent

| Ingredient | Illustrative Example 24 | Illustrative Example 25 | Illustrative Example 26 | Illustrative Example 27 |
|---|---|---|---|---|
| Gum Base | 28% | 28% | 28% | 28% |
| Sorbitol | 56% | 56% | 56% | 58.5% |
| Glycerin | 3% | 3% | 3% | 3% |
| Flavor | 2% | 2% | 2% | 2% |
| High Intensity Sweetener | 1% | 1% | 1% | 1% |
| De-oiled Lecithin | — | — | — | 2.5% |
| HPC | — | — | — | — |
| PVAc Encapsulated HPC (50% active) | 10% | 5% | — | 5% |
| PVAc Encapsulated De-Oiled Lecithin (25%) and HPC (25%) | — | — | 10% | — |

It should be appreciated that the methods and compositions of the present invention are capable of being incorporated in the form of a variety of embodiments, only a few of which have been illustrated and described above. The invention may be embodied in other forms without departing from its spirit or essential characteristics. The described embodiments are to be considered only as illustrative and not restrictive.

What is claimed is:

1. A chewing gum comprising:
   a) a primary chewing gum composition comprising a gum base, a sweetener and a flavoring agent, and
   b) a food-acceptable delayed-interaction modification agent wherein a modification agent comprises lipase, and wherein the delayed-interaction modification agent is physically or chemically prevented from substantially interacting or reacting with a targeted primary chewing gum component of the composition until after the gum has been chewed and discarded;
   c) wherein the delayed-interaction modification agent reacts with the primary chewing gum composition after a chewed cud of the gum composition is formed; and
   d) wherein the modification agent is present in an amount sufficient to cause the primary chewing gum composition to exhibit increased environmental acceptability after the gum is chewed for 12 minutes and the chewed cud is discarded, as compared to a chewing gum of the same composition but without the delayed-interaction modification agent, and wherein the modification agent comprises between about 5% and about 50% by weight of the delayed-interaction modification agent and wherein the chewed cud comprises at least one fat that remains in the gum cud after chewing.

2. The chewing gum of claim 1 wherein the modification agent is encapsulated with an encapsulant to form the delayed-interaction modification agent.

3. The chewing gum of claim 2 wherein the encapsulant is water insoluble.

4. The chewing gum of claim 2 wherein the encapsulant is applied to the modification agent by fluidized bed encapsulation, spray chilling encapsulation, a melt process, or by a granulation process.

5. The chewing gum of claim 2 wherein the encapsulant comprises a polymer.

6. The chewing gum of claim 2 wherein the encapsulant is selected from the group consisting of polyvinylacetate, shellac, zein, and wax.

7. The chewing gum of claim 1 wherein the delayed-interaction modification agent comprises a lipase that is immobilized by being covalently bonded to a matrix so that the lipase will not release from gum base when the gum is chewed.

8. The chewing gum of claim 1 wherein the modification agent is present at a level of at least about 0.5 wt. % of the chewing gum composition.

9. The chewing gum of claim 1 wherein the modification agent is present at a level of up to about 10 wt. % of the chewing gum composition.

10. The chewing gum of claim 1 wherein the modification agent is present at a level of about 2 wt. % to about 5 wt. % of the chewing gum composition.

11. The chewing gum of claim 2 wherein the modification agent is present at a level of 10% to about 35% by weight of the encapsulated modification agent.

12. The chewing gum of claim 1 wherein the delayed interaction of the modification agent is initiated by an environmental element.

13. The chewing gum of claim 12 wherein the environmental element is water.

14. The chewing gum of claim 1 wherein the delayed interaction of the modification agent is initiated by chewing.

15. The chewing gum of claim 1 wherein the delayed-interaction modification agent is a delayed-release modification agent that is released after the chewed cud is discarded.

16. The chewing gum of claim 1 wherein the gum base contains less than 5% of non-silica fillers.

17. The chewing gum of claim 1 wherein the gum base comprises high molecular weight polyisobutylene.

18. The chewing gum of claim 1 wherein the gum base is a reduced-adhesion gum base, as compared to a conventional chewing gum base; a disintegratable gum base; or a biodegradable gum base.

19. The chewing gum of claim 1 wherein a chewed cud is non-adhesive after the chewed cud is discarded.

20. The chewing gum of claim 1 wherein the primary chewing gum composition comprises at least one of an encapsulated sweetener and an encapsulated flavoring agent.

21. The chewing gum of claim 1 wherein the primary chewing gum composition comprises an encapsulated sweetener and an encapsulated flavoring agent.

22. The chewing gum of claim 1 wherein at least a portion of the flavoring agent is isolated from the gum base.

23. A method of producing a chewing gum having increased environmental acceptability comprising incorporating a food-acceptable delayed-interaction modification agent into a primary chewing gum composition comprising a gum base, a sweetener and a flavoring agent, the delayed-interaction modification agent being present in an amount sufficient such that, when the gum is chewed for 12 minutes and a chewed cud is formed, the delayed-interaction modification agent reacts with the primary chewing gum composition and causes the primary chewing gum composition to exhibit increased environmental acceptability after the chewed cud is discarded, as compared to a chewing gum of the same composition but without the delayed-interaction modification agent; wherein the delayed-interaction modification agent is physically or chemically prevented from substantially interacting or reacting with a targeted primary chewing gum component of the composition until after the gum has been chewed and discarded, and wherein a modification agent comprises between about 5% and about 50% by weight of the delayed-interaction modification agent, wherein the modification agent comprises lipase and wherein the chewed cud comprises at least one fat that remains in the gum cud after chewing.

24. The method of claim 23 wherein the modification agent is encapsulated with an encapsulant to form the delayed-interaction modification agent.

25. The method of claim 23 comprising incorporating at least two delayed-interaction modification agents into the chewing gum.

26. The method of claim 24 wherein the encapsulant is selected from the group consisting of corn syrup solids, gum acacia, hydrocolloids, polysaccharides, polyvinyl acetate, polyvinyl laurate, polyvinyl stearate, vinylacetate-vinyllaurate copolymer, shellac, protein, and wax.

27. The chewing gum of claim 1 wherein the increased environmental acceptability is such that when one stick of gum or two pellets of gum are chewed for 12 minutes and then placed in water at about 13-21° C. for several minutes, then the gum cud is placed on a concrete paver kept at room temperature for 24 hours before gum application, with a release paper placed on top of the gum cud and two additional pavers placed on top with the gum sandwiched in between pavers, with the pavers and gum cud placed in an oven at 32° C. for 24 hours then cooled to room temperature and the top two pavers and the release paper being removed and the gum cud is allowed to age for 3 days, and then a Tennant 5700 XP mechanical sweeper is used with one dry pass and four wet passes over the gum cud, with the gum cud thereafter being visually assessed to determine the amount of gum cud removed, the amount being at least about 47%.

28. The chewing gum of claim 27 wherein the increased environmental acceptability is such that when one stick of gum or two pellets of gum are chewed for 12 minutes and then placed in water at about 13-21° C. for several minutes, then the gum cud is placed on a concrete paver kept at room temperature for 24 hours before gum application, with a release paper placed on top of the gum cud and two additional pavers placed on top with the gum sandwiched in between pavers, with the pavers and gum cud placed in an oven at 32° C. for 24 hours then cooled to room temperature and the top two pavers and the release paper being removed and the gum cud is allowed to age for 3 days, and then a Tennant 5700 XP mechanical sweeper is used with one dry pass and four wet passes over the gum cud, with the gum cud thereafter being visually assessed to determine the amount of gum cud removed, the amount being at least about 57%.

29. The chewing gum of claim 1 wherein the chewing gum has a resistance to gum dissolution in a simulated chewing test wherein the gum sample undergoes accelerated aging at conditions of 45° C. and 85% relative humidity for 1 week, and the sample is placed in a Brabender mixer with frequent addition of lipase solution, simulating the mouth chewing action, and the time elapsed before the test sample falls apart in the Brabender mixer is at least four hours.

30. The method of claim 23 wherein the increased environmental acceptability is such that when one stick of gum or two pellets of gum are chewed for 12 minutes and then placed in water at about 13-21° C. for several minutes, then the gum cud is placed on a concrete paver kept at room temperature for 24 hours before gum application, with a release paper placed on top of the gum cud and two additional pavers placed on top with the gum sandwiched in between pavers, with the pavers and gum cud placed in an oven at 32° C. for 24 hours then cooled to room temperature and the top two pavers and the release paper being removed and the gum cud is allowed to age for 3 days, and then a Tennant 5700 XP mechanical sweeper is used with one dry pass and four wet passes over the gum cud, with the gum cud thereafter being visually assessed to determine the amount of gum cud removed, the amount being at least about 47%.

31. The method of claim 23 wherein the increased environmental acceptability is such that when one stick of gum or two pellets of gum are chewed for 12 minutes and then placed in water at about 13-21° C. for several minutes, then the gum cud is placed on a concrete paver kept at room temperature for 24 hours before gum application, with a release paper placed on top of the gum cud and two additional pavers placed on top with the gum sandwiched in between pavers, with the pavers and gum cud placed in an oven at 32° C. for 24 hours then cooled to room temperature and the top two pavers and the release paper being removed and the gum cud is allowed to age for 3 days, and then a Tennant 5700 XP mechanical sweeper is used with one dry pass and four wet passes over the gum cud, with the gum cud thereafter being visually assessed to determine the amount of gum cud removed, the amount being at least about 57%.

32. The method of claim 23 wherein the chewing gum has a resistance to gum dissolution in a simulated chewing test wherein the gum sample undergoes accelerated aging at conditions of 45° C. and 85% relative humidity for 1 week, and the sample is placed in a Brabender mixer with frequent addition of lipase solution, simulating the mouth chewing action, and the time elapsed before the test sample falls apart in the Brabender mixer is at least four hours.

33. The chewing gum of claim 1 wherein the modification agent is encapsulated with a material selected from the group consisting of polyvinyl acetate, polyvinyl laurate, polyvinyl stearate, vinylacetate-vinyllaurate copolymer, shellac and wax.

34. The method of claim 24 wherein the encapsulant is selected from the group consisting of polyvinyl acetate, polyvinyl laurate, polyvinyl stearate, vinylacetate-vinyllaurate copolymer, shellac and wax.

35. A chewing gum comprising:
   a) a primary chewing gum composition comprising a gum base, a sweetener and a flavoring agent, and
   b) a food-acceptable delayed-interaction modification agent, wherein a modification agent comprises lecithin and is encapsulated to form the delayed-interaction modification agent, and wherein the modification agent comprises between 33% and 59% of the delayed-interaction modification agent; and
   c) wherein the delayed-interaction modification agent reacts with the primary chewing gum composition after a chewed cud of the gum composition is formed and
   d) wherein the modification agent causes the primary chewing gum composition to exhibit increased environmental acceptability after the chewed cud is discarded as compared to a chewing gum of the same composition but without the delayed-interaction modification agent.

36. The chewing gum of claim 35 wherein the lecithin comprises enzyme hydrolyzed lecithin.

37. The chewing gum of claim 35 wherein the lecithin comprises lecithin with high content of hydrophilic fractions.

38. The chewing gum of claim 35 wherein the lecithin comprises de-oiled lecithin.

* * * * *